US008046009B2

United States Patent
Bodmer et al.

(10) Patent No.: US 8,046,009 B2
(45) Date of Patent: Oct. 25, 2011

(54) METHOD AND APPARATUS FOR INTEGRATING MULTI-MEDIA MESSAGING AND IMAGE SERVING ABILITIES

(75) Inventors: Brian Bodmer, Santa Cruz, CA (US); Eric Bodnar, Santa Cruz, CA (US); Timothy Genske, Aptos, CA (US)

(73) Assignee: Syniverse ICX Corporation, Tampa, FL (US)

( * ) Notice: Subject to any disclaimer, the term of this patent is extended or adjusted under 35 U.S.C. 154(b) by 608 days.

(21) Appl. No.: 10/893,469

(22) Filed: Jul. 16, 2004

(65) Prior Publication Data

US 2006/0013196 A1    Jan. 19, 2006

(51) Int. Cl.
*H04W 4/00*    (2009.01)
(52) U.S. Cl. ......... 455/466; 370/338; 370/466; 709/206
(58) Field of Classification Search .................. 370/338, 370/392, 466; 455/466, 412.1–2; 709/206; 379/93.01
See application file for complete search history.

(56) References Cited

U.S. PATENT DOCUMENTS

| | | | | |
|---|---|---|---|---|
| 6,424,828 B1* | 7/2002 | Collins et al. | ............... | 455/412.1 |
| 6,895,425 B1* | 5/2005 | Kadyk et al. | .................. | 709/203 |
| 7,072,943 B2* | 7/2006 | Landesmann | ................. | 709/206 |
| 7,149,964 B1 | 12/2006 | Cottrille et al. | | |
| 7,171,222 B2* | 1/2007 | Fostick | ......................... | 455/466 |
| 7,649,895 B2* | 1/2010 | Kadar et al. | .................. | 370/396 |
| 7,653,734 B1* | 1/2010 | Aho | .............................. | 709/231 |
| 2002/0042830 A1 | 4/2002 | Bose et al. | | |
| 2002/0044634 A1* | 4/2002 | Rooke et al. | ............... | 379/93.01 |
| 2002/0078228 A1* | 6/2002 | Kuisma et al. | ................ | 709/237 |
| 2002/0122543 A1* | 9/2002 | Rowen | ........................ | 379/93.01 |
| 2004/0176067 A1 | 9/2004 | Lakhani et al. | | |
| 2004/0242202 A1* | 12/2004 | Torvinen | ......................... | 455/412.1 |
| 2005/0009541 A1* | 1/2005 | Ye et al. | ......................... | 455/466 |
| 2005/0141522 A1* | 6/2005 | Kadar et al. | .................. | 370/396 |
| 2005/0143106 A1 | 6/2005 | Chan et al. | | |
| 2005/0165719 A1 | 7/2005 | Greenspan et al. | | |
| 2005/0216403 A1 | 9/2005 | Tam et al. | | |
| 2005/0258938 A1* | 11/2005 | Moulson | ....................... | 340/7.58 |
| 2006/0009243 A1* | 1/2006 | Dahan et al. | .................. | 455/466 |
| 2007/0040892 A1 | 2/2007 | Aoki et al. | | |
| 2007/0165790 A1* | 7/2007 | Taori | ............................. | 379/67.1 |
| 2009/0197575 A1* | 8/2009 | Degraeve | .................... | 455/412.1 |

OTHER PUBLICATIONS

"Access and Terminals (AT); Multimedia Message Service (MMS) for PSTN/ISDN; Multimedia Message Communication between a fixed network Multimedia Message Terminal Equipment and a Multimedia Message Service Centre," ETSI AT-F Rapporteur Meeting, Feb. 4-6, 2003, Gothenburg, DES/AT-030023 V0.0.1 (Mar. 2003).

* cited by examiner

*Primary Examiner* — Dwayne Bost
*Assistant Examiner* — Amancio Gonzalez
(74) *Attorney, Agent, or Firm* — Blakely, Sokoloff, Taylor & Zafman LLP; Judith A. Szepesi (57) ABSTRACT

A method and apparatus for providing a user inbox on an multi-media service center (MMSC), the user inbox using a central repository for storing multimedia content on the MMSC.

24 Claims, 10 Drawing Sheets

Message Store 130

| MM Name | MM Location | Lock Status |
|---|---|---|
| Skiing on 1.1.2000 | /brian/images/video/skii00.rm | None |
| Eric @ Dinner | /brian/images/pics/eri.jpeg | None |
| Snapshot at meeting | /brian/images/pics/snapmt.gif | No fwd |
| JanetJackson video | /brian/images/video/service/jjv.rm | $0.03/fwd |

Outbox 410

| To | Title | Link Sent? | Charge? |
|---|---|---|---|
| Philippe K.@ sameprovider | Video of skiing | Yes | No |
| Eric B.@outside provider | Picture of you at dinner | No | No |
| Gerry S. @ sameprovider | Check out this Janet Video | Yes | Yes |

Inbox 420

| From | Title |
|---|---|
| Eric B @ sameprovider | Video of skiing |
| Subscription Service | Janet Jackson's New Video $ |
| Gerry S. @ sameprovider | Picture from our meeting x |

METHOD AND APPARATUS FOR INTEGRATING MULTI-MEDIA MESSAGING AND IMAGE SERVING ABILITIES

FIELD OF THE INVENTION

The present invention relates to integration of various services, and in particular to the integration of multi-media messaging with different services.

BACKGROUND

Multi-media messaging enables users to send multi-media messages to other users via their cellular telephones. Multi-media messaging is limited in its abilities, and is defined by a Specification.

PictureMail is a service provided by LightSurf, Inc. It enables a user to share messages between mobile devices as well as with any e-mail address. Users can create PictureMail messages using pictures from a camera phone, pictures that are already online, or pictures that have been previously downloaded to the phone. Users simply select the picture to share, add a short text or voice message, and click send. Subscribers can organize all their pictures into online albums for easy storage and retrieval. These albums can also be shared as PictureMail slideshows. Additionally, subscribers and their guests can post messages to a Guestbook about PictureMails they have received.

SUMMARY OF THE INVENTION

A method and apparatus for providing a user inbox on an multi-media service center (MMSC), the user inbox using a central repository for storing multimedia content on the MMSC.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for an integration of multimedia service center (MMSC) with additional services is described. The additional services enable a user to have an inbox on the MMSC. The user's multimedia content is stored in a central repository available to the user through the inbox on the MMSC. In one embodiment, this further enables the reduction of memory requirements on the handset, as only the headers and pointers to the MMSC inbox are stored on the handset for messages not currently being viewed. Furthermore, the inbox in one embodiment includes a reference to a full-size versions of multimedia content. The reference may be a pointer, the actual multimedia content itself, or another indicator of where to retrieve the content. When the MMSC forwards the content to the user handset, it is reformatted for display on the user's handset. However, if the user forwards the multimedia content through a Web access, forwards it to other users, or otherwise accesses or users the content, the full-size versions of the content are available. Other advantages of the present system are described in more detail below.

Figure 1:
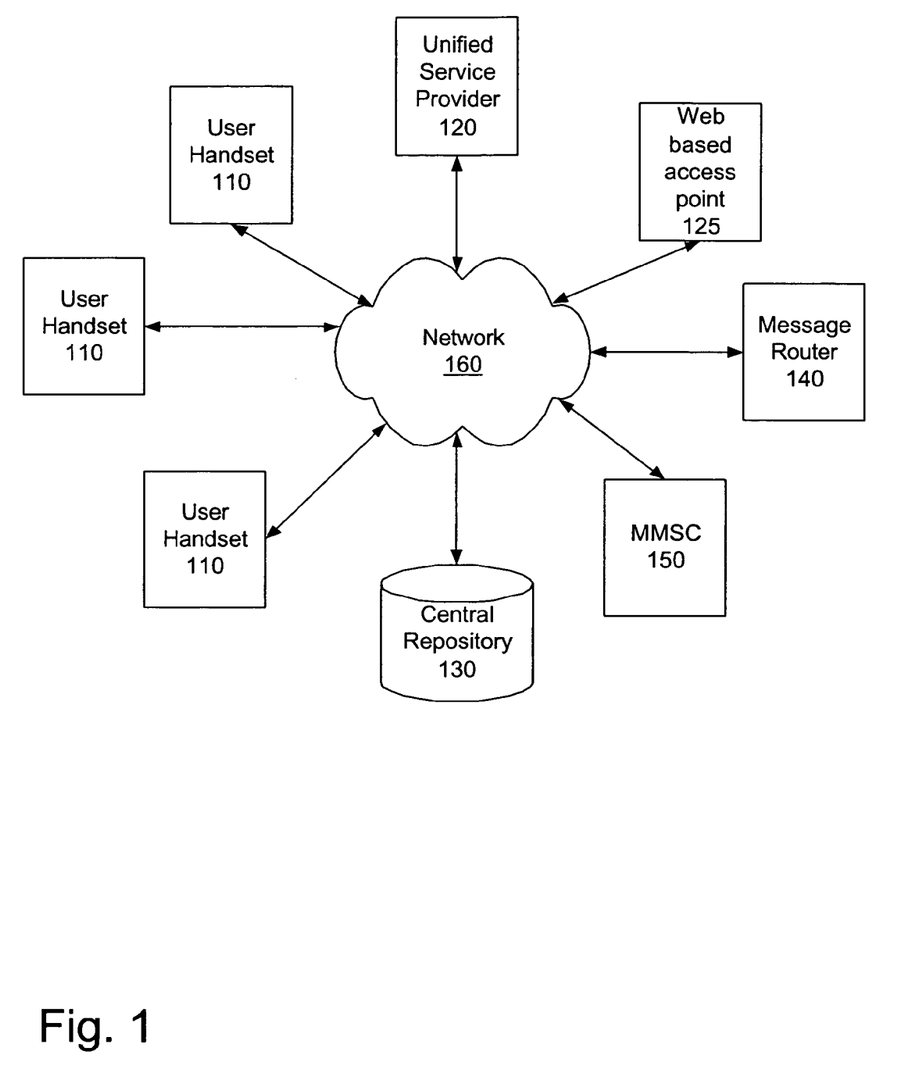
FIG. 1 is a block diagram of a network on which the present invention may be implemented.

FIG. 1 is a block diagram of a network on which the present invention may be implemented. The network 160 couples user handsets 110 to a central repository 130, which stores user multimedia data. The central repository 130 is accessible to a multimedia service center (MMSC) 150. The unified service provider 120, in one embodiment, is the extended MMSC, which provides the MMSC-based inbox for the user. The message router 140 enables the system to determine whether to send messages using the MMSC 150 or the unified service provider 120. In one embodiment, the MMSC 150 users defined MMSC protocols to send messages. The unified service provider 120 uses other protocols, as will be described in more detail below. The system further enables web based access point 125, which permits the user to access the multi-media data in repository 130 using a browser, or similar tool. In one embodiment, standard Web based tools such as a browser allow the user to log into the central repository 130 to view the user's multimedia content. In another embodiment, a special application must be used to access the repository 130. In one embodiment, a secure log-in is used to ensure security.

Figure 2:
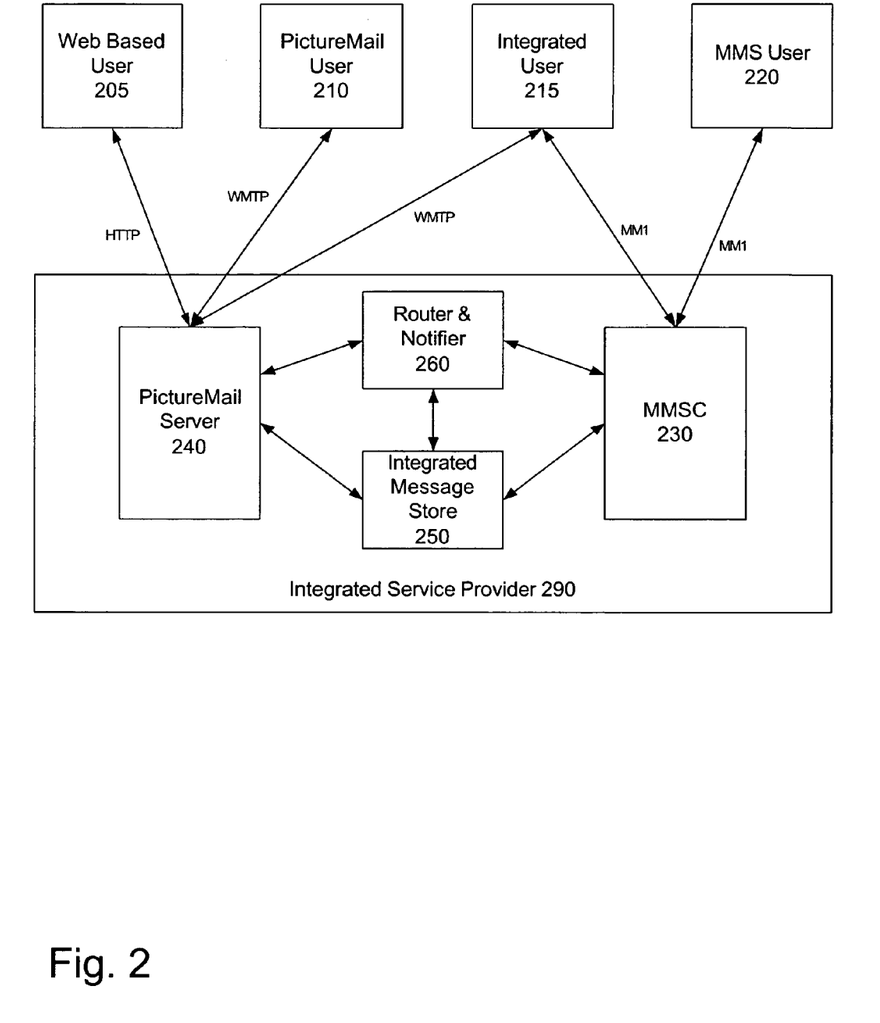
FIG. 2 is a block diagram of one embodiment of an integrated media service.

FIG. 2 is a block diagram of one embodiment of an integrated media service. Three types of handsets are described. A PictureMail user 210 has a handset that cannot communicate using the MMSC protocols, but can communicate using XXMP, a handset protocol. An alternative protocol, such as XXX may be used. The Integrated User 215 can use Picture-Mail protocols as well as MMSC protocols to communicate. The MMS user can communicate only using MMSC-based protocols.

The MMSC 230 uses standard MM1 protocols to communicate multimedia messages to handsets 215, 220 enabled to receive MM1 protocol-based messages. The PictureMail server 240 uses alternative protocols to communicate with handsets 210, 215 that are enabled to use its protocols. The PictureMail server 240 also enables web-based access 205.

In one embodiment, the unified provider 290 includes the PictureMail server 240 and MMSC 230. Note that while these elements are described in terms of PictureMail and MMSC, the unified provider 290 is actually a single system that is capable of using multiple protocols to communicate, depending on user handset ability. The actual protocols used need not be XXMTP and MM1.

In one embodiment, the system further includes a router & notifier 260, to determine which communication protocol will be used to send and receive multimedia messages. In particular, certain messages are better transferred using the MM1 protocol, and other messages cannot be easily transferred using the MM1 protocol. Router & notifier 260 determines which protocol/subsystem should be used to send the multimedia message to the user, and routes the data to the appropriate subsystem 230, 240.

Integrated message store 250, or message repository, stores the multimedia data of the user. All of the protocols/subsystems 230, 240 use integrated message store 250, in one embodiment. Integrated message store 250 is used to reduce the storage requirements of handsets 210, 215, 220, by eliminating the need for the user to keep full copies of the multimedia messages on the handsets 210, 215, 220.

Figure 3:
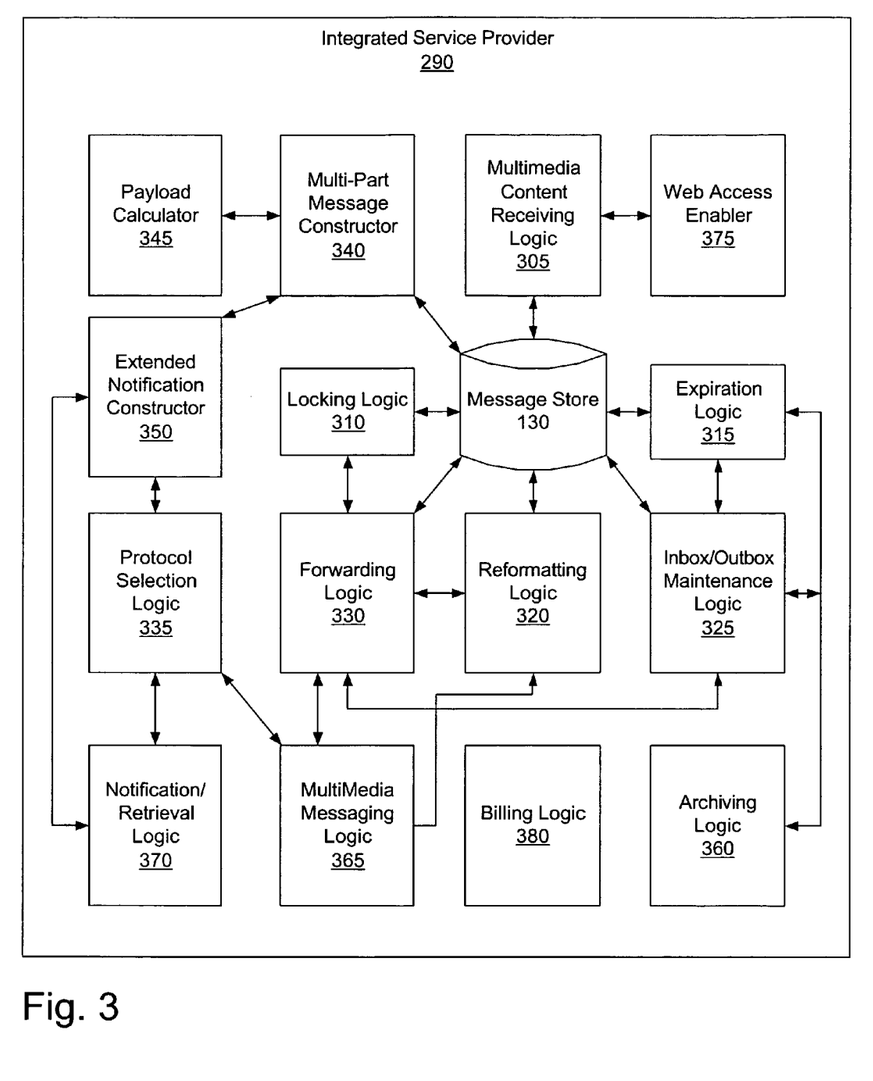
FIG. 3 is a block diagram of one embodiment of the integrated service provider.

FIG. 3 is a block diagram of one embodiment of the integrated service provider. Multimedia content receiving logic 305 receives multimedia content, and stores the multimedia content in message store 130. The multimedia receiving logic 305 may receive multimedia content from the user's handset, for example if the handset includes a camera or video recorder. The multimedia content receiving logic 305 may also receive content via web site access, using Web access enabler 375. Multimedia content receiving logic 305 may also receive content via standard MMSC protocols, from messages sent to the user from various sources.

The expiration logic 315 adds an expiration date to the messages stored in the message store 130 by multimedia content receiving logic 305. The expiration date, in one embodiment, is a preset days after a message is first viewed. In another embodiment, the expiration date is a preset number of days after the multimedia content is received, and is not affected by whether the user has viewed the data or not. Archiving logic 360 enables the user to archive messages (prevent expiration logic 315 from deleting them at the end of the preset number of days). In one embodiment, archiving logic 360 stores the archived messages in a different repository, or different segment of message store 130 than the user's inbox. In another embodiment, the archiving logic 360 simply allows the user to override the expiration logic 315, and keep the multimedia content in the user's inbox.

Inbox/outbox maintenance 325 updates the user's inbox and outbox, when multimedia messages are received and/or sent by the user. Note that the actual data is stored in the message store 130.

Reformatting logic 320 is used to reformat the multimedia content for a handset. In one embodiment, reformatting logic 320 receives the handset information either from notification/retrieval logic 370 or from stored data. The multimedia content, which is stored in "original" or "full" format in message store 130 is then reformatted to display properly on the user's handset.

In one embodiment, if the user forwards a message, the forwarding logic 330 also uses reformatting logic 320. If the message is being sent to a traditional MMSC, the multimedia content is reformatted to ensure that the MMSC can handle the content. For example, there is a maximum size on multimedia content that can be sent in an MM7 message, to another MMSC. Reformatting logic 320 ensures that content is appropriately formatted. Locking logic 310 may prevent forwarding logic 330 from forwarding multimedia content that is locked, or request authorization from the user to forward content that requires additional billing. Billing logic 380 tracks such billing, as well as the receipt and sending of multimedia messages, and bills them appropriately.

The system includes extended notification constructor 350. Extended notification constructor enables a notification that includes additional data. For example, the extended notification may include a thumbnail or other representative small image of the multimedia content. The notification may include the title of the multimedia content. The notification may include the payload (size) of the multimedia content. Payload calculator 345 calculates the estimated size of the multimedia content. This information may be included with the extended notification.

Any other relevant information about the multimedia content may be included in the extended notification. Notification/Retrieval logic 360 sends out the notification to the user. In one embodiment, the extended notification may be a feature turned on by the user.

Protocol selection logic 335 enables the system to automatically select the method of communication that is optimal for the message being sent. The protocols may include MM1, supported by MMSCs, as well as Wireless Access Protocol (WAP), WMTP, and other protocols.

Notification/Retrieval logic 360 receives a retrieval message from the user. In one embodiment, the retrieval message may include a maximum payload size. Payload calculator 345 calculates the actual payload size for the multimedia content. If the multimedia content is too large to send in a single message, multi-part message constructor 340 constructs a multi-part message. In one embodiment, the multi-part message is simply a series of messages, which are sequentially retrieved by the user. In one embodiment, each message has a number in the series. For example, a message may include as part of its title "Part 3 of 4" to indicate to the user what the status of the multi-part message is. In another embodiment, the multi-part message is prefetching, such that a next message portion is fetched while the user is viewing the first message portion. In one embodiment, a message portion may have embedded in it a request to fetch a next message portion, such that when the user reaches the embedded command portion of the message portion, the next message starts fetching.

In this way, the present system enables a user to use the message store 130 and provides additional services beyond those provided by an MMSC.

Figure 4:
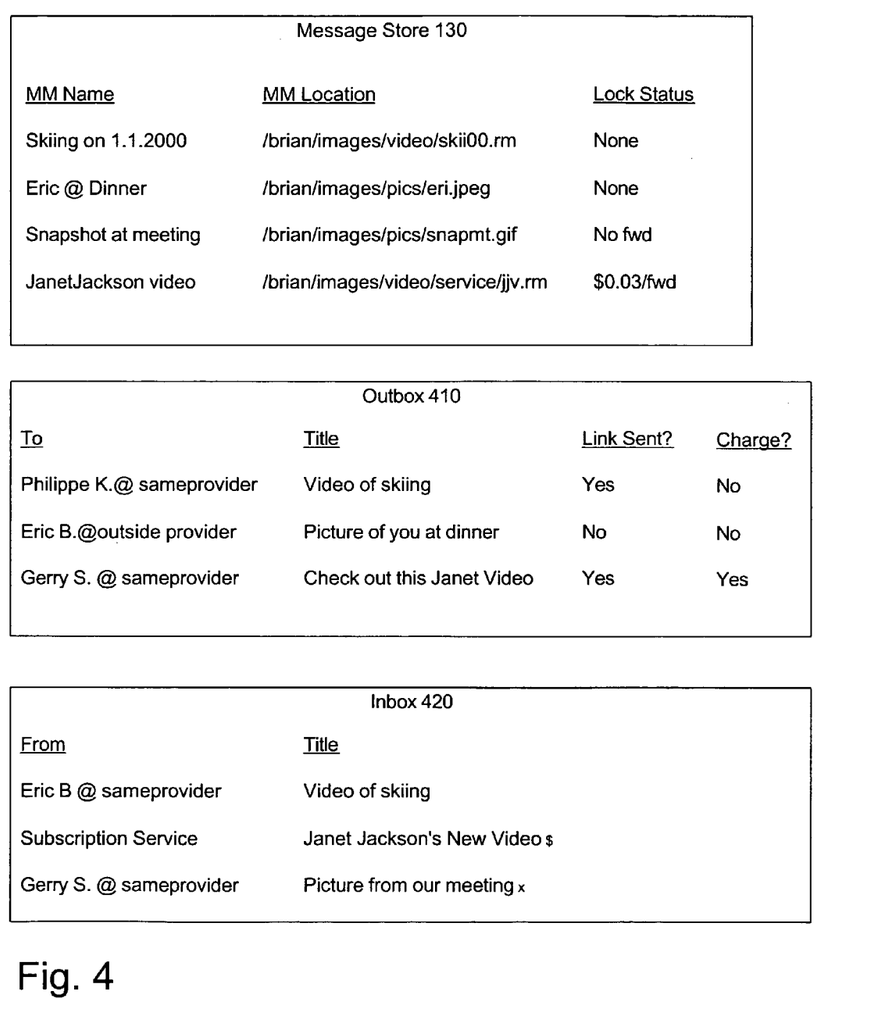
FIG. 4 is a block diagram of one embodiment of the integrated repository and user inbox and outbox.

FIG. 4 is a block diagram of one embodiment of the integrated repository and user inbox and outbox. The Message store 130 stores the multimedia messages The message store 130 includes the name of the multimedia content, as well as its location. In one embodiment, it also includes a "lock status" which indicates whether the multimedia content can be passed on to others, and if so whether there are any restrictions.

The user's outbox 410 includes copies of messages sent. Note that these messages do not include actual copies of the multimedia content, but rather include a link to the copy of the multimedia content in the message store 130. The Link Sent section indicates whether the recipient is with the same provider as the user.

The user's inbox 420 includes copies of the message headers, with links to the multimedia content in the message store 130. Note that by using the message store 130, instead of having one full copy of the multimedia message received, or multiple copies if the user forwards the message to multiple recipients, the handset does not need to store any copies of the multimedia content. This is advantageous as it reduces the storage requirement on the handset. Furthermore, since the copy of the multimedia message stored in the repository 130 is the highest quality available, the image is not degraded through multiple sending cycles.

Figure 5:
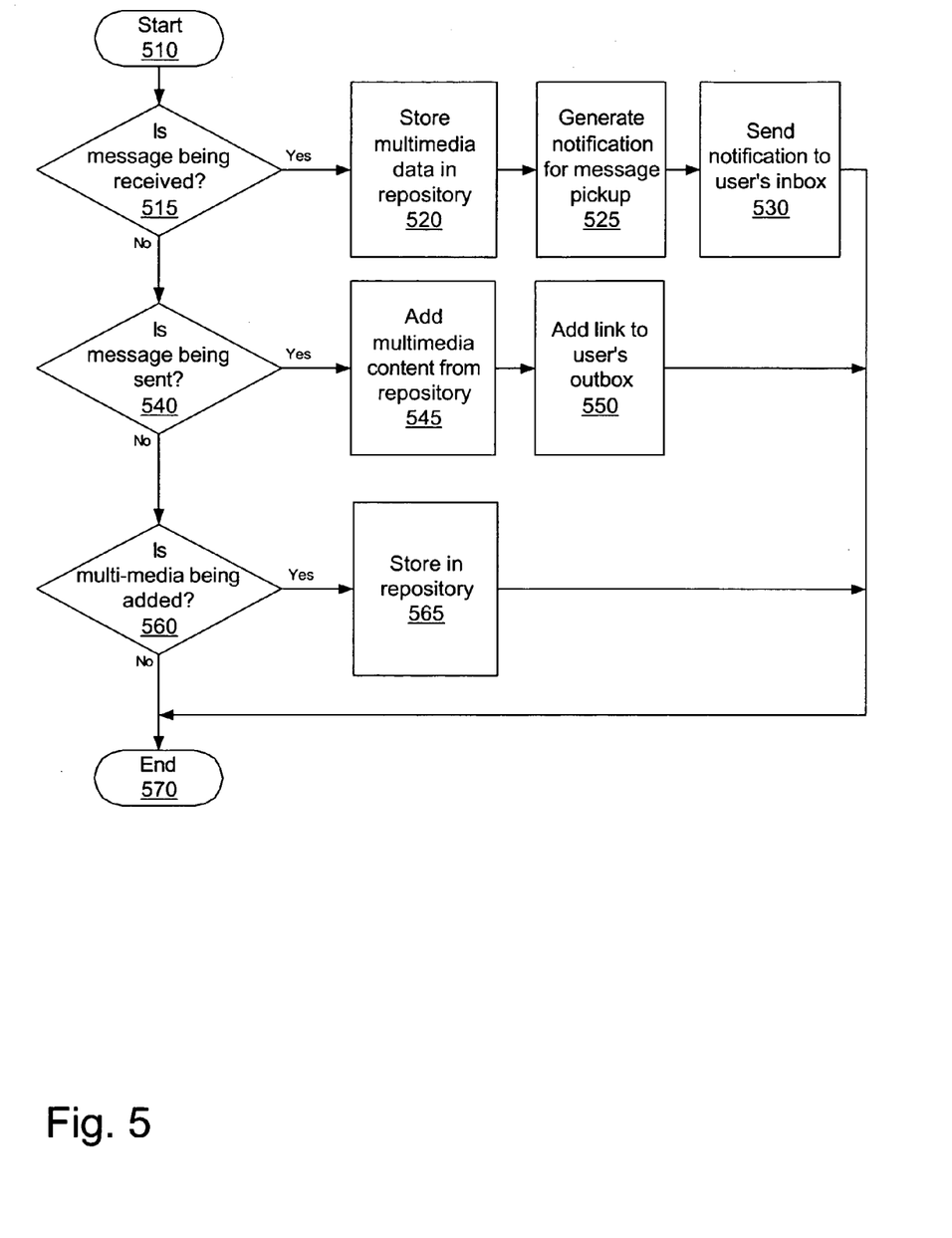
FIG. 5 is an overview flowchart of one embodiment of providing the integrated media service.

FIG. 5 is an overview flowchart of one embodiment of providing the integrated media service. The process starts at block 510. At bock 515, the process determines whether a message is being received. If so, the process continues to block 520.

At block 520, the multimedia data associated with the message is stored in a central repository. The multimedia data may including photographs, video, or other multi-media data. At block 525, a notification is generated for message pickup.

In one embodiment, as will be described in more detail below, the notification is an extended notification.

At block 530, the notification is sent to the user's inbox. The user can then pick up the message from the server, as will be described in more detail with respect to FIGS. 6A and 6B. The process then ends at block 570.

If, at block 515, a message was not being received, the process continued to block 540.

At block 540, the process determines whether a message is being sent. A message may be sent as forwarding of an existing message, or by creating a new message.

At block 545, multimedia data from the repository is selected by the user, and made part of the message. In one embodiment, the user only downloads/views a thumbnail or other small representation of the multimedia portion of the message, for attachment. In one embodiment, the actual message sent includes the larger size multimedia data stored in the repository.

At block 550, the message is added to the user's outbox. In one embodiment, only the message header is stored in the outbox, with a link to the repository. This reduces the size of the outbox. It also enables the user to later access the full-size image. The process then ends at block 570.

If the message was not being sent at block 540, the process continued to block 560.

At block 560, the process determines whether multimedia data is being added to the system. Multimedia data may be added using a camera phone, by taking a picture, or recording video. Multimedia data may be added by uploading directly to the handset or web site. Other means of adding multimedia data to the user's account may be used. If multimedia data is being added, at block 565, the data is stored in the repository. Note that the data, in one embodiment, may also remain on the user's handset. In one embodiment, a smaller image, designed to be displayed on the user's handset, remains on the handset. However, the larger original image originally received is stored in the repository. It remains accessible to the user.

The process then ends at block 570. Note that while these processes are described in flowchart form here and below, in actual embodiment, they may be interrupt driven processes. That is the system does not loop through waiting for an action, but rather reacts as described if the action occurs.

Figure 6A:
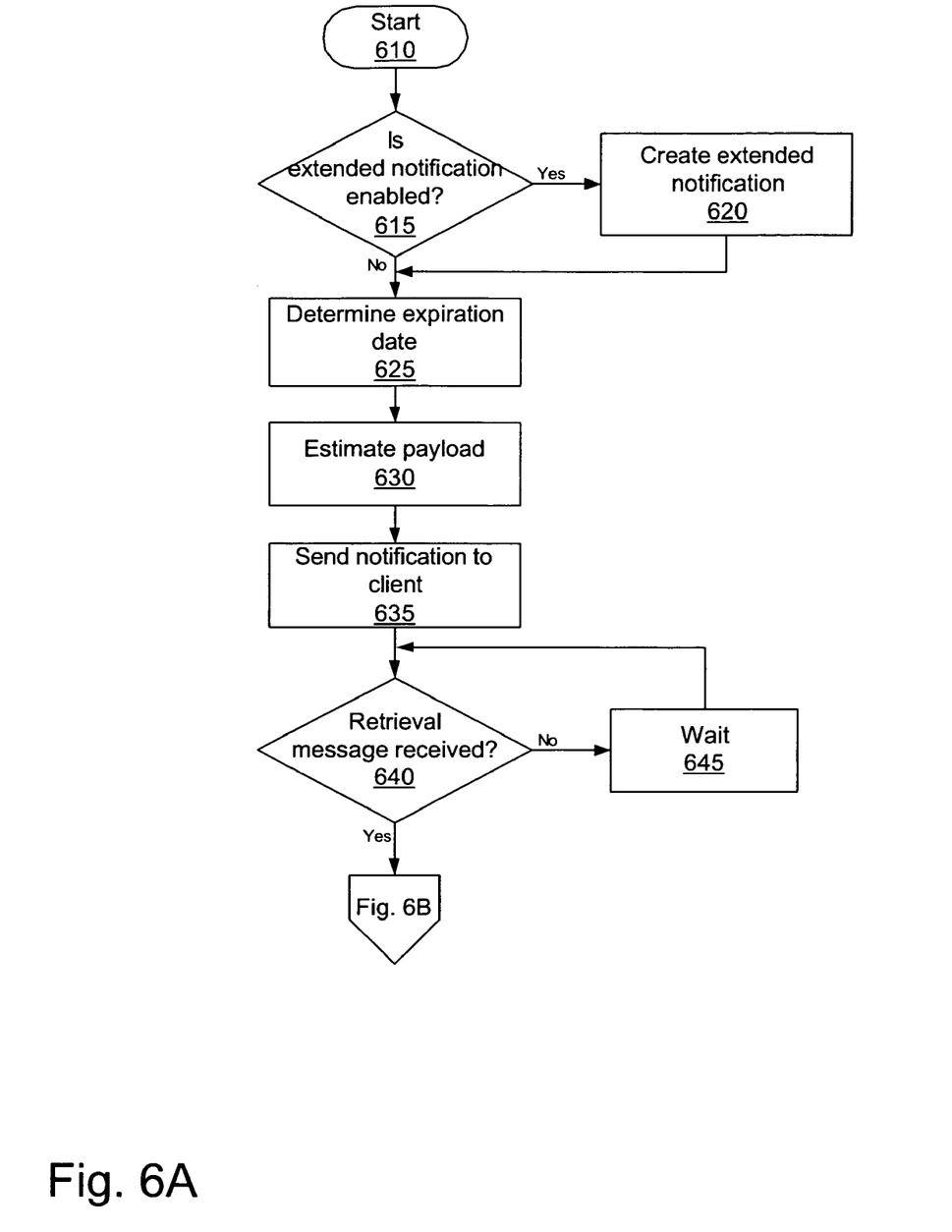
FIGS. 6A and 6B are flowcharts of one embodiment of notification & retrieval from MMSC's perspective.
Figure 6B:
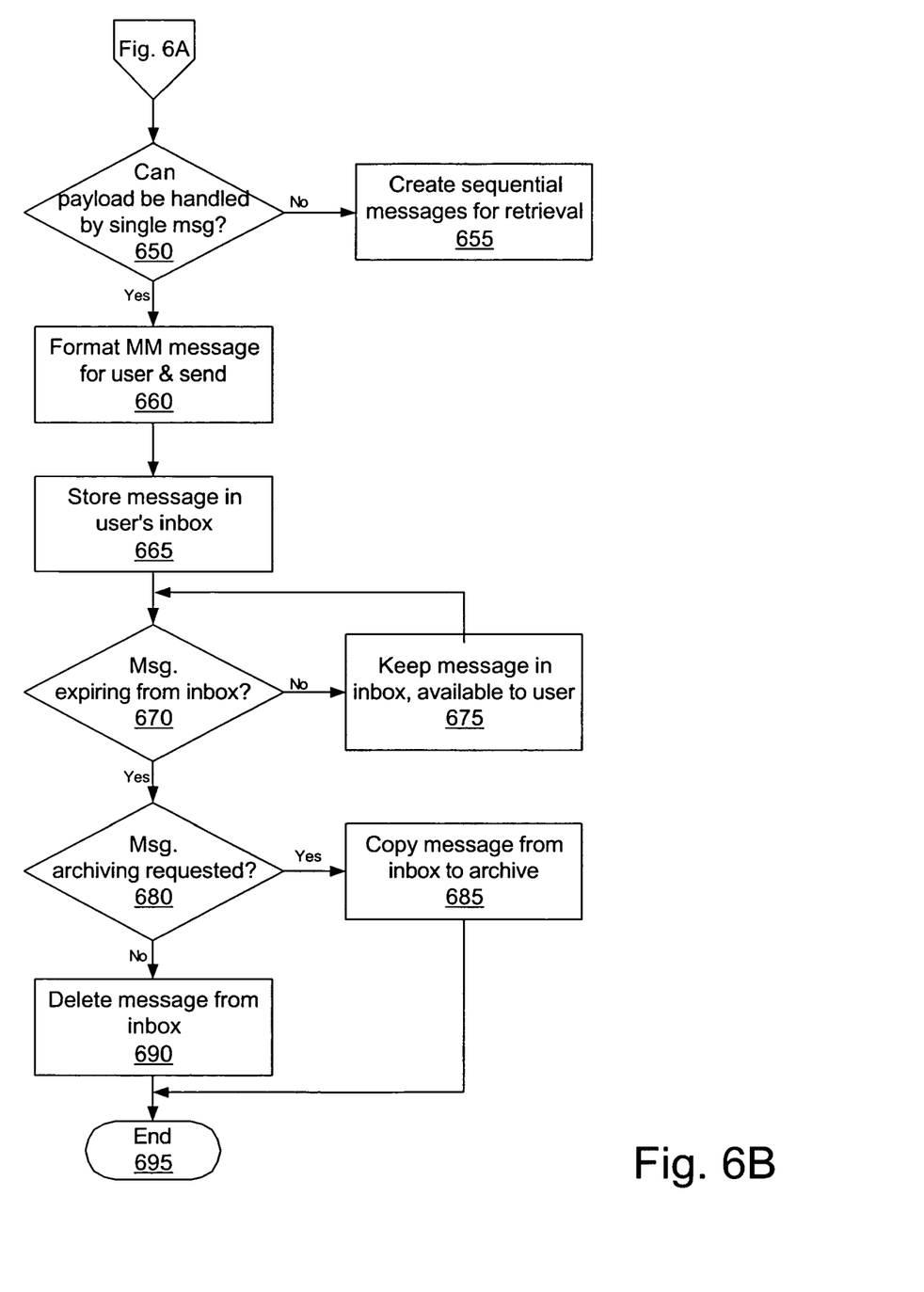

FIGS. 6A and 6B are flowcharts of one embodiment of notification & retrieval from MMSC's perspective. The process starts at block 610, when a new message is received to be sent to the user.

At block 615, the process determines whether extended notification is enabled. Extended notification adds additional data to the notification. In one embodiment, extended notification may create a thumbnail of the multimedia data. In another embodiment, extended notification may include the title of the multimedia data, or other information about the multimedia data that may be extracted or created by the MMSC. If extended notification is enabled, at block 620, the extended notification data is extracted by or created by the MMSC. The process then continues to block 625. Otherwise, the process continues directly to block 625.

At block 625, the expiration date of the message is determined. Since the message is stored in the message repository, and remains accessible to the user, an expiration date is assigned. In traditional MMSC practice, the message is forwarded to the user upon request, and at that time is deleted from the MMSC. Because the present system uses a repository, the message is not deleted until its expiration data.

At block 630, the payload is estimated. The payload is the size of the multimedia message, once it is properly formatted for the user's handset.

At block 635, the notification is sent to the client. The notification may be the extended notification, or a smaller notification. The notification may include the estimated payload.

At block 640, the process determines whether a response has been received from the user, to retrieve the message. If not, the process waits at block 645, until a retrieval message is received. In one embodiment, the process may actually verify that the message has not expired, during this period. In one embodiment, if the message expires before the user picks it up, the message is deleted. In another embodiment, the message cannot expire until the user has picked it up. When the retrieval message is received, the process continues to block 650.

At block 650, the process determines whether the entire payload can be handled by a single message. In one embodiment, the retrieval message includes the maximum payload that the user's system can handle. In another embodiment, the retrieval message indicates the user's handset, and the present system calculates the maximum payload that the user's handset can handle. If the payload cannot be handled in a single message, the process continues to block 655. Otherwise, the process continues to block 660.

At block 655, a set of sequential messages is created to send the multimedia data to the user. In one embodiment, the sequential messages may be self-loading. In one embodiment, a message may include a retrieval message, automatically sent to the MMSC to retrieve the next message. The process then continues to block 660.

At block 660, the multimedia message is formatted for the user's handset, and sent. Note that if the message is multiple sequential messages, one or more of the messages are sent to the handset, and this process may repeat until all messages are sent to the handset.

At block 665, the message is stored in the user's inbox on the MMSC. In one embodiment, the message stored includes the full-size multimedia data. In one embodiment, the message also includes the multimedia data formatted for the user's handset. The user can access the inbox from the handset or through a web interface.

At block 670, the process determines whether the message is expiring from the inbox. If the message is not expiring, it remains in the inbox, and is available to the user, at block 675. In one embodiment, messages are available to the user via the MMSC, accessible through the handset, and via a web-based interface accessible through the Internet.

If the message is expiring from the inbox, at block 680, the process determines whether message archiving has been requested. Message archiving means that a message is not deleted from the inbox. In one embodiment, archiving comprises storing the archived message permanently in another location, the archive. In another embodiment, archiving comprises storing the archived message permanently in the user's inbox. If message archiving is requested, the process continues to block 685, and the message is placed in the archive. In one embodiment, the user may request archiving at any time. In one embodiment, the message is copied to the separate archive. In another embodiment, the message is marked "archived" in the inbox, and simply not deleted. If archiving is not requested, at block 690 the message is deleted from the inbox. The process then ends at block 695.

Figure 7:
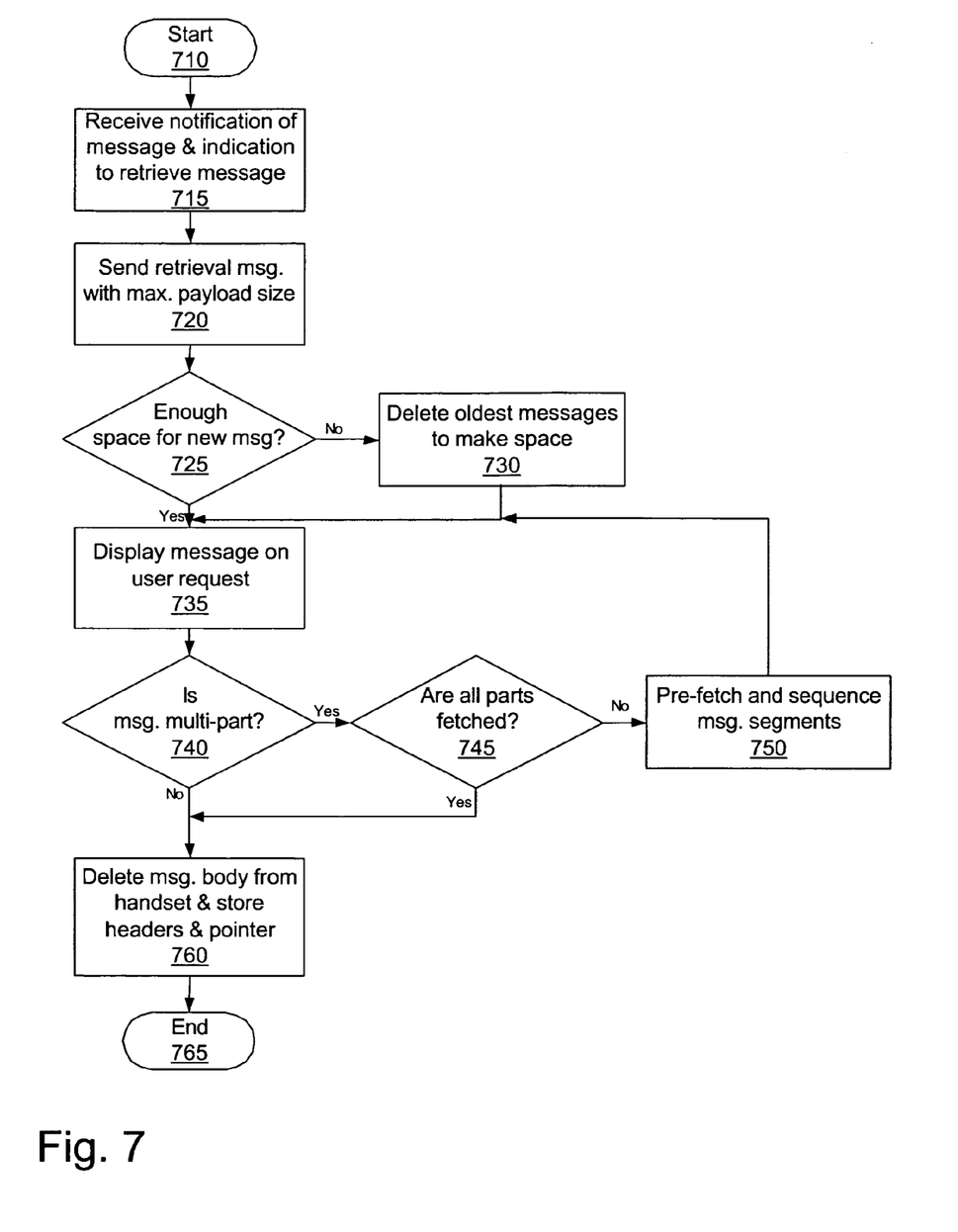
FIG. 7 is a flowchart of one embodiment of notification & retrieval from the handset's perspective.

FIG. 7 is a flowchart of one embodiment of notification & retrieval from the handset's perspective. The process starts at block 710. At block 715, the handset receives a notification.

The message notification indicates that the user can download a multimedia message from the MMSC. In one embodiment, the notification may be an extended notification which includes a thumbnail, title, or other description of the contents of the multimedia payload. In one embodiment, the notification also includes an indication of the estimated size of the payload.

At block 720, the retrieval message is sent. In one embodiment, the retrieval message includes a maximum payload size. The maximum payload size depends on the user's handset. In one embodiment, the retrieval message simply indicates the user's handset type, which automatically defines the maximum payload size. In another embodiment, the maximum payload size is determined by the memory in the handset, which may depend on the user's configuration—for example, the user may have a flashcard of some size to store multimedia content. The size of the memory may be sent in the retrieval message.

At block 725, the process determines whether there is enough memory to store the new message. If there is not enough memory, at block 730, the oldest message is deleted to make space for the incoming message. The process then continues to block 735.

In another embodiment, this step may be skipped. In one embodiment, the message may be stored only in temporary memory for display to the user, without placing it in long-term storage (i.e. stored in Random Access Memory for display, but not stored in flash memory). If there is sufficient space or the handset will not store the message in memory, the process continues to block 735.

At block 735, the message is displayed upon user request.

At block 740, the process determines whether the message is a multi-part message. In one embodiment, this is determined when the message is received. In one embodiment, the first message (if the message is a multi-part message) will include code to retrieve the next part of the message, and so on. If the message is a multipart message, at block 745, the process determines whether all of the segments have been displayed. If so, the process continues to block 760. Otherwise, the process continues to block 750 to prefetch the next message segment.

At block 750, next message segment is prefetched. The process then returns to block 735, to display the next message segment. This enables the user to seamlessly experience the multimedia message. For example, if the message consists of 4 parts, each part has, for example, 10 photos associated with it. While the user is viewing the photos in the first message, the second message is prefetched. When the user starts viewing the second message, the third message is prefetched, and so on. In this way, the user experience is seamless.

If the message was not a multi-part message, the process continues directly to block 760. At block 760, the message body is deleted from the handset. In one embodiment, only the pointer for the message is stored. The pointer points to the copy of the message in the user's inbox on the MMSC. Thus, if the user selects the message, it is refetched from the MMSC. This significantly reduces the memory requirements for the user's handset.

In another embodiment, the inbox on the handset also includes the header information. Note that deletion from the handset inbox does not affect the MMSC inbox of the user. The messages remain in the MMSC inbox until they expire, in one embodiment, as described above. In another embodiment, the user may flag the message for deletion on the handset only, deletion on the handset and MMSC, full-retention on the handset, or archiving (permanent retention in the MMSC inbox). The process then ends at block 765.

Figure 8:
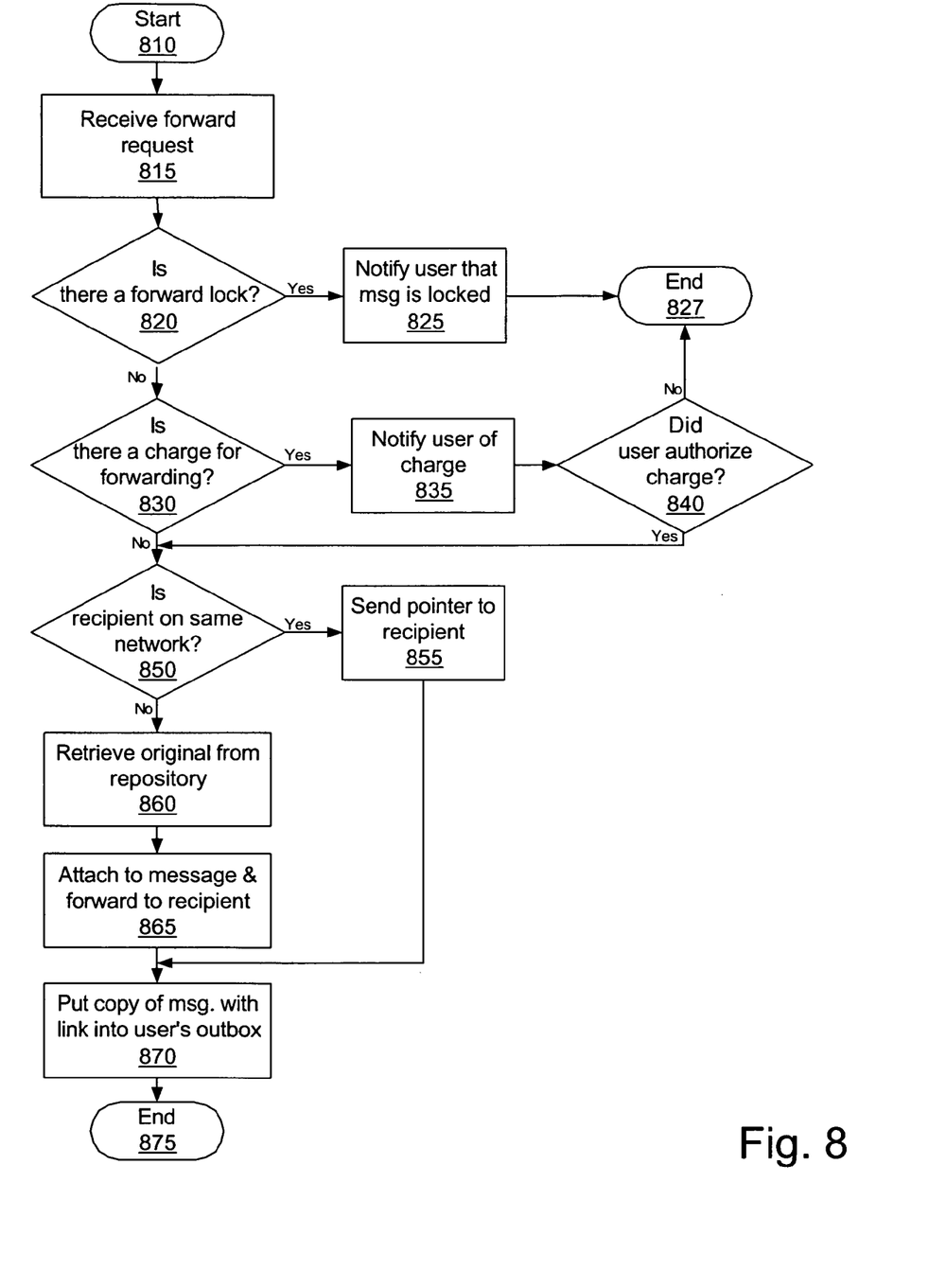
FIG. 8 is a flowchart of one embodiment of forwarding a message.

FIG. 8 is a flowchart of one embodiment of forwarding a message. The process starts at block 810. At block 815, the forward request is received. In one embodiment, the user selects a message from their inbox, either on the handset or the MMSC, and selects the Forward option. In one embodiment, when a message is sent to the user, the user's system retrieves the message only temporarily, and the user's inbox on the handset maintains only a pointer to the user's inbox on the server, where the complete copy of the message is stored. Thus, when the user selects the "forward" option, instead of retrieving the message to the handset, the system simply forwards the pointer, with any new data (i.e. the new destination). For example, the forward message may simply include a new destination address, a new subject (if appropriate), and a reference to the original message in the repository.

At block 820, the process determines whether there is a forward lock. A forward lock is designed to prevent forwarding. For example, certain subscription services may prohibit forwarding of their materials. Furthermore, for copyright purposes, forwarding may be forbidden. If there is a forward lock, at block 825 the user is notified, and the process ends at block 827.

At block 830, the process determines whether there is a charge for forwarding. In one embodiment, certain subscription services may request a charge for forwarding. If there is a charge, at block 835, the user is notified. If the user authorizes the charge, at block 840, the process continues to block 850. Otherwise, the process ends at block 827.

If there is no forward charge, the process continues directly to block 850.

At block 850, the process determines whether the recipient is on the same network. In one embodiment, if the recipient is on the same network, a link to the message stored in the MMSC is simply forwarded to the recipient's handset. In one embodiment, no copy of the multimedia message is created in such a forward. However, a copy of the header & pointer information is placed in the recipient's inbox. The process then continues to block 870. At block 8470, a copy of the message with a pointer to the content is placed into the user's outbox. The process then ends at block 875.

If the recipient is found not to be on the same network at block 850, the process continues to block 860.

At block 860, the original multimedia content is retrieved from the user's repository. In one embodiment, the multimedia content is the original content, not content that has been optimized for the user's handset. This ensures that forwarded messages do not degrade, but that each recipient gets multimedia content that is at the best possible quality.

At block 865, the multimedia content is attached to the message and the message is forwarded to the recipient.

At block 870, a copy of the message is placed into the user's outbox. Note that the message does not contain a full copy of the multimedia content, but rather includes a link to the copy of the multimedia content in the repository. The process then ends at block 875.

Figure 9:
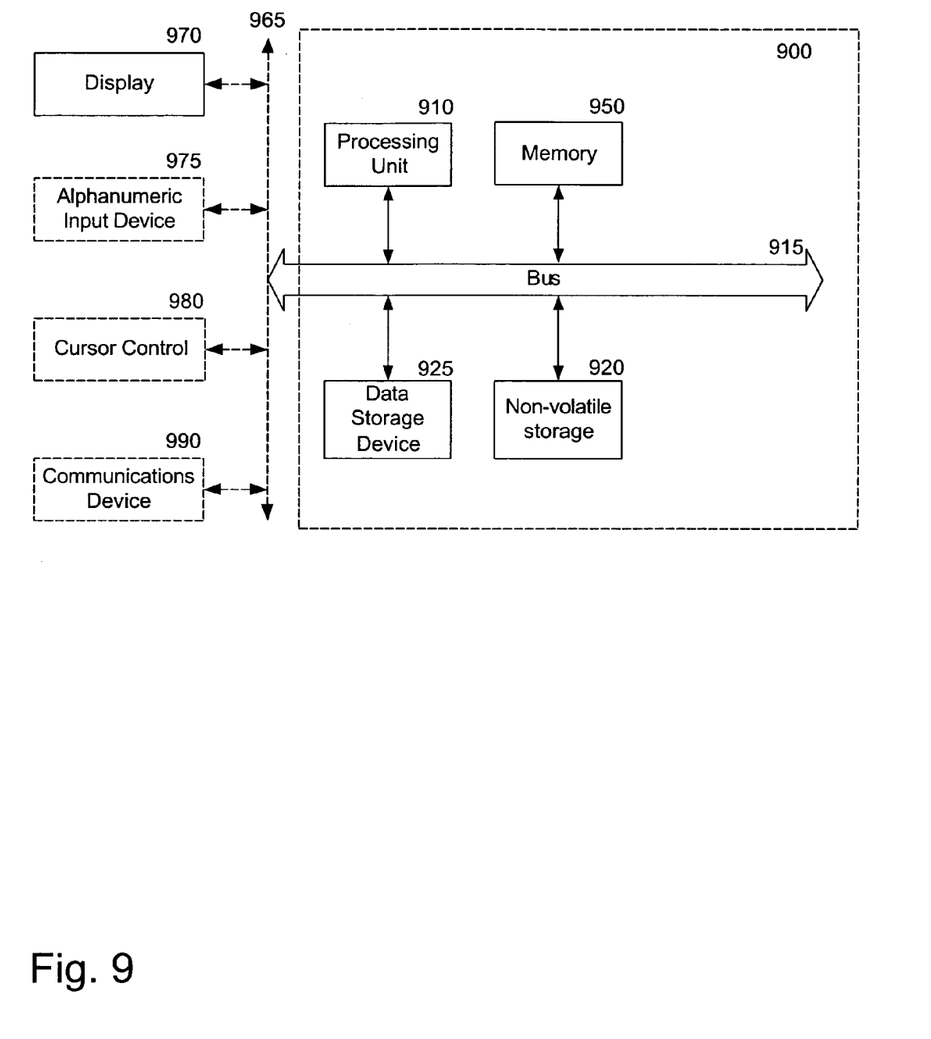
FIG. 9 is a block diagram of one embodiment of a computer system on which the present invention may be implemented.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method in an integrated messaging server comprising:
   receiving a multimedia message in a wireless communications network including multimedia content in an integrated messaging server;
   storing the multimedia content in a repository of the integrated messaging server;
   selecting an optimal communications protocol from among a plurality of communications protocols for delivery of a multimedia message to a user's handset based on content of the multimedia message to be sent, the user's handset a handheld device for communicating on the wireless communications network;
   forwarding a notification to the user's handset via the wireless communications network including a header and a pointer, the notification for storage on the user's handset without storage of the multimedia content on the user's handset, the pointer pointing to the multimedia content in the repository;
   maintaining a user inbox of received multimedia messages corresponding to the inbox on the user's handset at the integrated messaging server with a reference to the multimedia content in the repository on the integrated messaging server, the user inbox at the integrated messaging server managing a collection of multimedia messages that correspond to a plurality of messages sent to the user's handset from a plurality of different message sources and received by the integrated messaging server;
   enabling the user to forward the original multimedia content via the wireless communications network, wherein the pointer to the original multimedia content in the repository is forwarded in a forwarded message to a recipient when the user and the recipient are subscribers to a first wireless network, and the original multimedia content is attached to the forwarded message when the recipient subscribes to a second wireless network, the first wireless network and the second wireless network are provided by different wireless service providers; and placing a copy of the forwarded message in a user outbox on the user's handset, the copy comprising header information for the multimedia message and a reference to the multimedia content in the repository.

2. The method of claim 1, further comprising:
expiring the multimedia content from the repository.

3. The method of claim 2, further comprising:
enabling a user to archive the multimedia content to prevent expiration of the multimedia content from the repository.

4. The method of claim 1, wherein the multimedia content stored in the repository comprises an original multimedia content, and further comprising:
reformatting the original multimedia content for the user's handset.

5. The method of claim 1, further comprising:
reformatting the original multimedia content if a recipient is on a limited ability MMSC, which cannot handle the original multimedia content without reformatting.

6. The method of claim 1, further comprising:
creating an extended notification for the user.

7. The method of claim 6, wherein the extended notification comprises a thumbnail of the multimedia content.

8. The method of claim 6, wherein the extended notification comprises a full title of the multimedia content.

9. The method of claim 6, wherein the extended notification comprises a payload size estimate, indicating an estimated size of the multimedia content.

10. The method of claim 1, further comprising:
determining if the multimedia content is too large to retrieve at once; and
creating a multi-part message to enable retrieval of a sequence of messages representing the too large multimedia content.

11. The method of claim 10, wherein the multi-part message includes an MM1 retrieve pointer embedded in each non-final message in the sequence to enable automatic retrieval of a next subsequent message from the sequence.

12. An integrated message server comprising:
a multimedia content receiving logic to receive a multimedia message in a wireless communications network including multimedia content;
a message store to store the multimedia content at said integrated message server;
a protocol selection logic to select an optimal communications protocol from among a plurality of communications protocols for delivery of a multimedia message to a user's handset based on content of the multimedia message to be sent, the user's handset a handheld device for communicating on the wireless communications network;
a notification/retrieval logic to send a notification via the wireless communications network to the user's handset including a header and a pointer, the notification for storage on the user's handset without storage of the multimedia content on the user's handset, the pointer pointing to the multimedia content in the message store;
a forwarding logic to enable the user to forward the original multimedia content via the wireless communications network, wherein the pointer to the original multimedia content in the repository is forwarded in a forwarded message to a recipient when the user and the recipient are subscribers to a first wireless network, and the original multimedia content is attached to the forwarded message when the recipient subscribes to a second wireless network, the first wireless network and the second wireless network are provided by different wireless service providers; and an inbox/outbox maintenance logic of the integrated message server to maintain a user inbox of received multimedia messages including a reference to the multimedia content in the message store, and to keep a copy of the forwarded message in the user's outbox, the copy comprising header information and a reference to the multimedia content in the repository, the user inbox at the integrated message server managing a collection of multimedia messages that correspond to a plurality of messages sent to the user's handset from a plurality of different message sources and received by the integrated messaging server.

13. The integrated message server of claim 12, further comprising:
expiration logic to attach an expiration date to the multimedia content in from the message store, and to delete the multimedia content on the expiration date.

14. The integrated message server of claim 13, further comprising:
an archiving logic to enable a user to archive the multimedia content to prevent expiration of the multimedia content from the message store.

15. The integrated message server of claim 12, wherein the multimedia content stored in the message store comprises an original multimedia content, and further comprising:
a reformatting logic to format the original multimedia content for a user's handset.

16. The integrated message server of claim 12, further comprising:
reformatting logic to reformat original multimedia content if a recipient is on a limited ability MMSC, which cannot handle the original multimedia content without reformatting.

17. The integrated message server of claim 12, further comprising:
extended notification constructor to create an extended notification for the user.

18. The integrated message server of claim 17, wherein the extended notification comprises one or more of the following: a thumbnail of the multimedia content, a full title of the multimedia content, a payload size estimate, indicating an estimated size of the multimedia content.

19. The integrated message server of claim 18, further comprising:
a payload calculator to calculate the payload size estimate based on handset data and the multimedia content.

20. The integrated message server of claim 12, further comprising:
a multi-part message constructor to determine if the multimedia content is too large to retrieve at once, and if so, to create a multi-part message to enable retrieval of a sequence of messages representing the too large multimedia content.

21. The integrated message server of claim 20, wherein the multi-part message includes an MM1 retrieve pointer embedded in each non-final message in the sequence to enable automatic retrieval of a next subsequent message from the sequence.

22. An integrated messaging server comprising:
a multimedia content receiving logic to receive multimedia messages sent to a user handset over a wireless communications network, the multimedia messages including multimedia content, and the user handset a handheld device for communicating on the wireless communications network;

a message store to store the multimedia content at said integrated message server;

an inbox/outbox maintenance logic of the integrated message server to maintain a user inbox of received multimedia messages, the user inbox at the integrated message server managing a collection of multimedia messages that correspond to a plurality of messages sent to the user's handset from a plurality of different message sources and received by the integrated messaging server;

a notification/retrieval logic to send a notification to a user's handset, the notification including a header and a pointer, the notification for storage on the user's handset without storage of the multimedia content on the user's handset, the pointer pointing to the multimedia content in the message store, wherein the pointer to the multimedia content in the repository is forwarded in a forwarded message to a recipient when the user and the recipient are subscribers to a first network, and the original multimedia content is attached to the forwarded message when the recipient subscribes to a second network, the first wireless network and the second wireless network are provided by different wireless service providers.

23. The integrated messaging server of claim 22, further comprising:

a protocol selection logic to select an optimal communications protocol from among a plurality of communications protocols for delivery of a multimedia message to a user's handset based on the multimedia message to be sent.

24. The integrated messaging server of claim 22, further comprising:

expiration logic to attach an expiration date to the multimedia content in from the message store, and to delete the multimedia content on the expiration date.

* * * * *